Aug. 11, 1936.  W. T. SOULIS  2,050,471
SEMITRAILER
Filed May 17, 1932  7 Sheets-Sheet 5
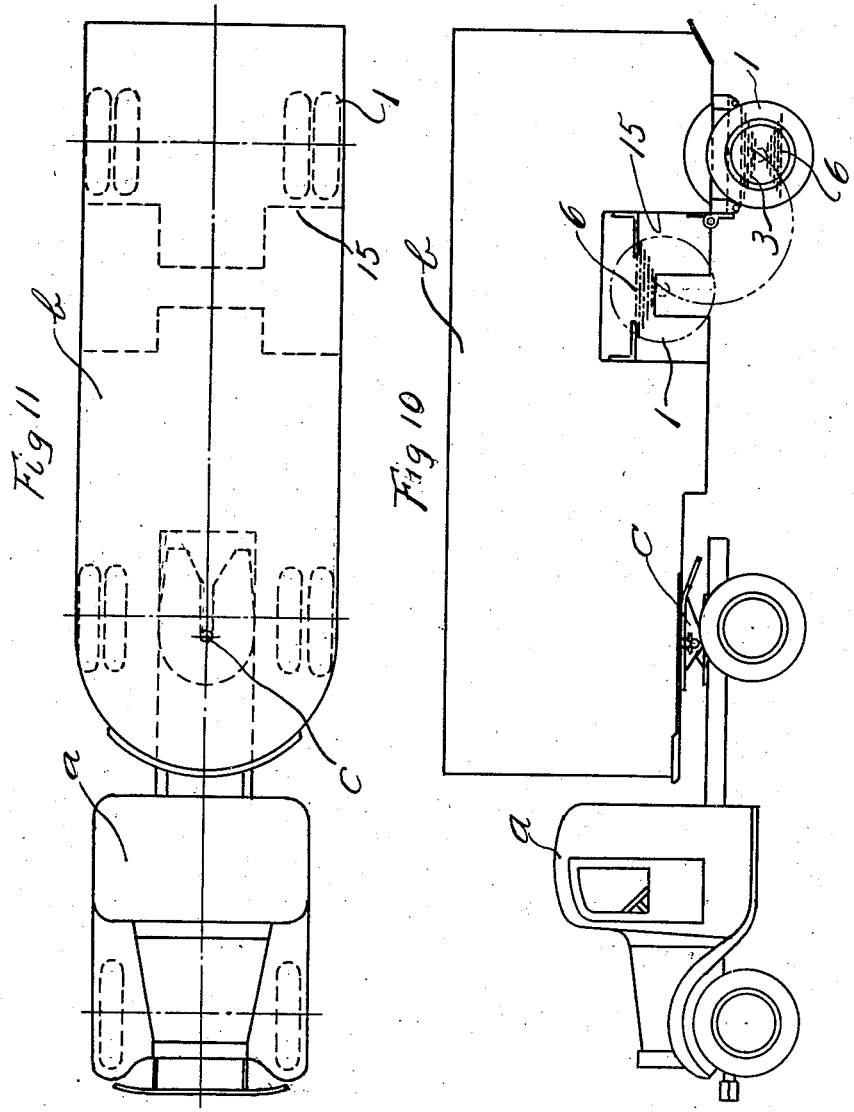
INVENTOR.
Wilbur T. Soulis Aug. 11, 1936.　　　　W. T. SOULIS　　　　2,050,471
SEMITRAILER
Filed May 17, 1932　　　7 Sheets-Sheet 6
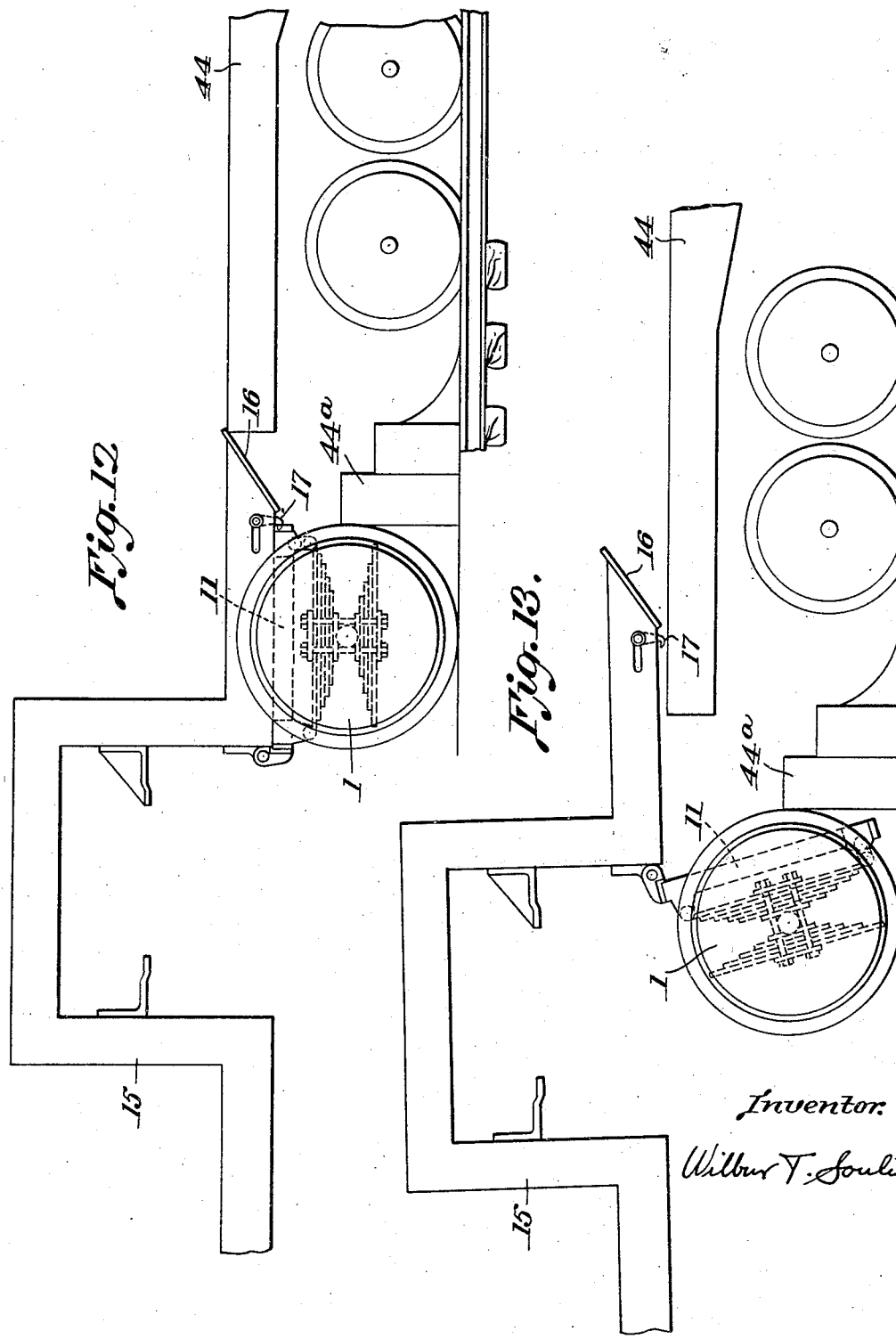
Inventor
Wilbur T. Soulis Aug. 11, 1936.  W. T. SOULIS  2,050,471
SEMITRAILER
Filed May 17, 1932   7 Sheets-Sheet 7

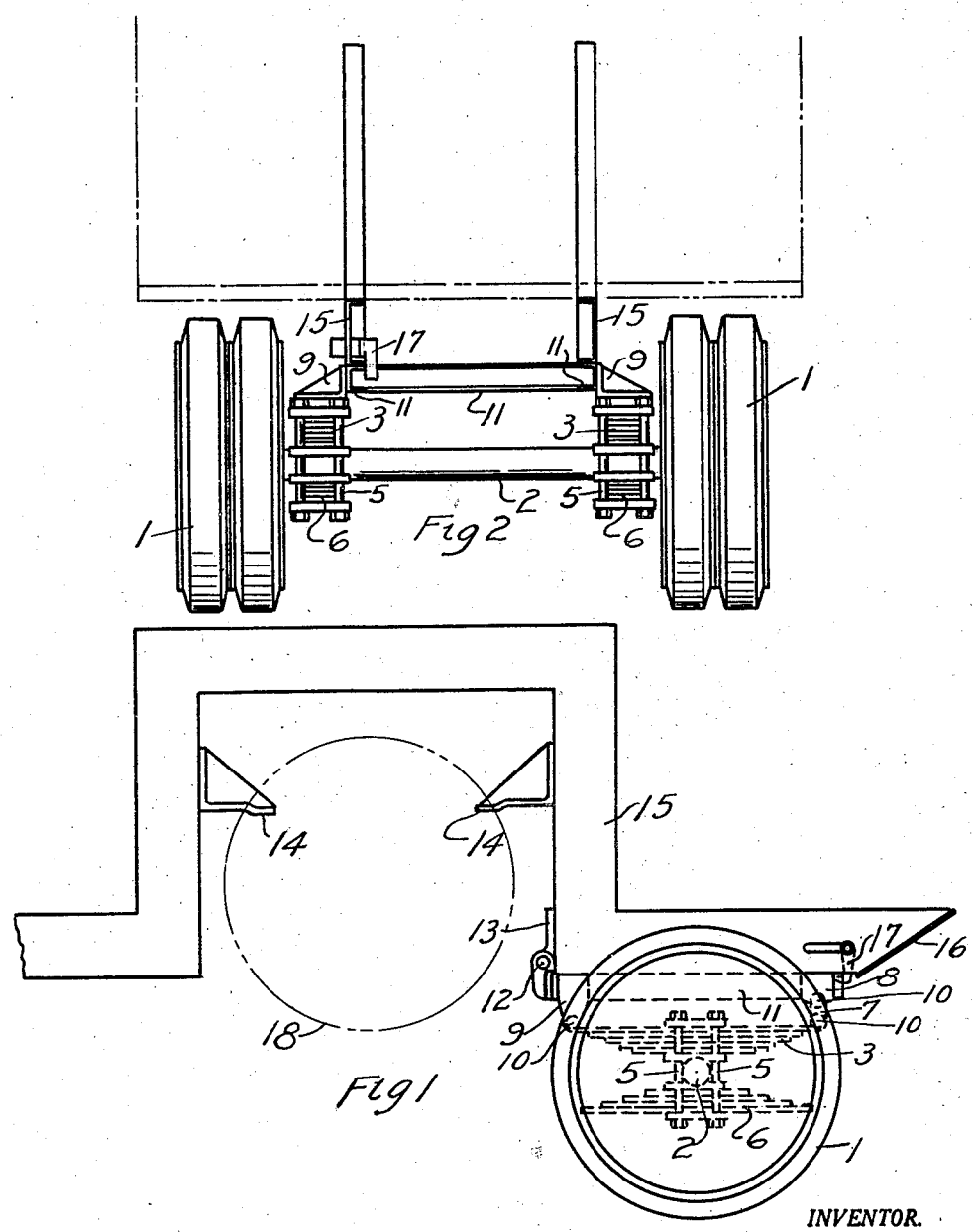

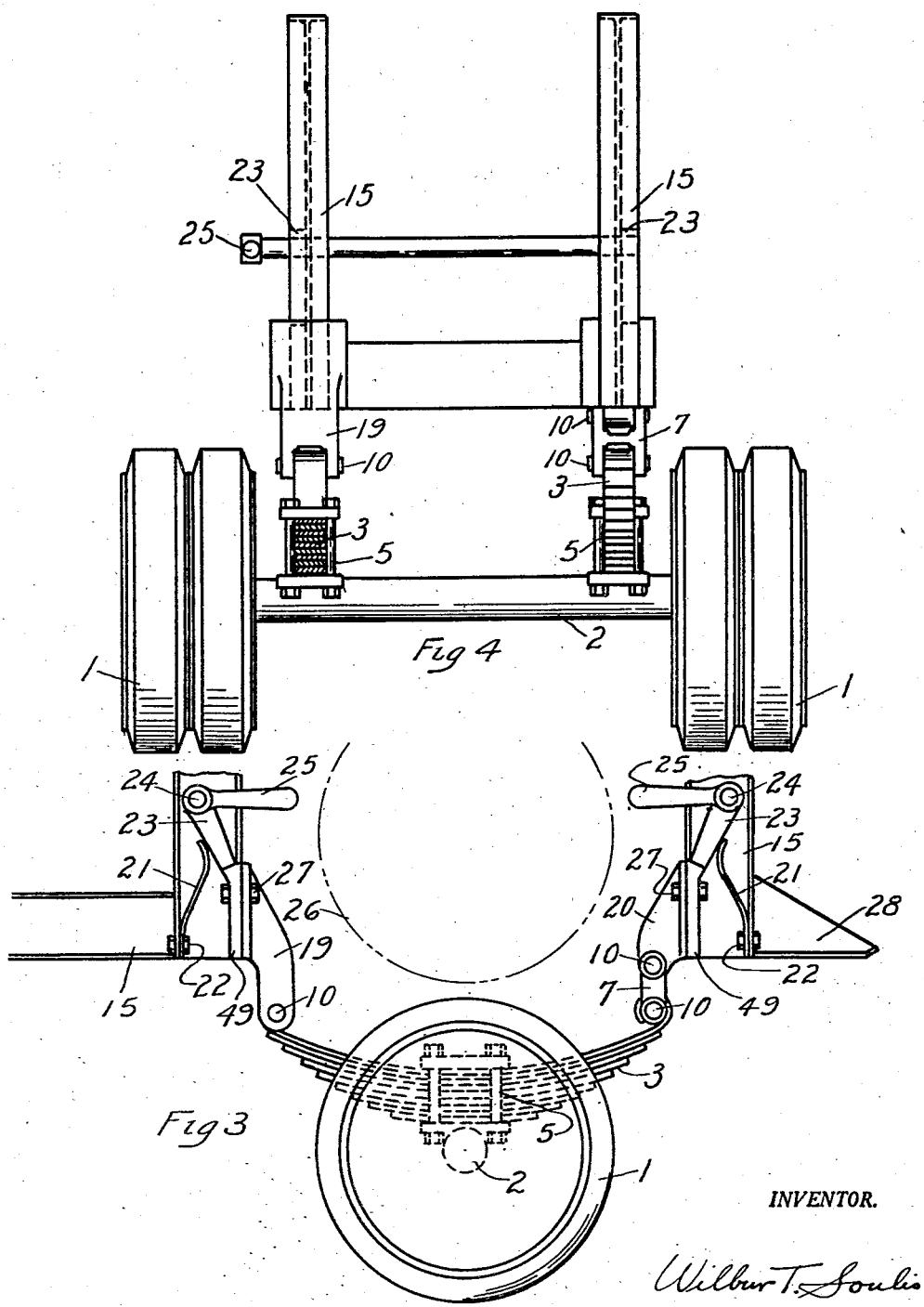

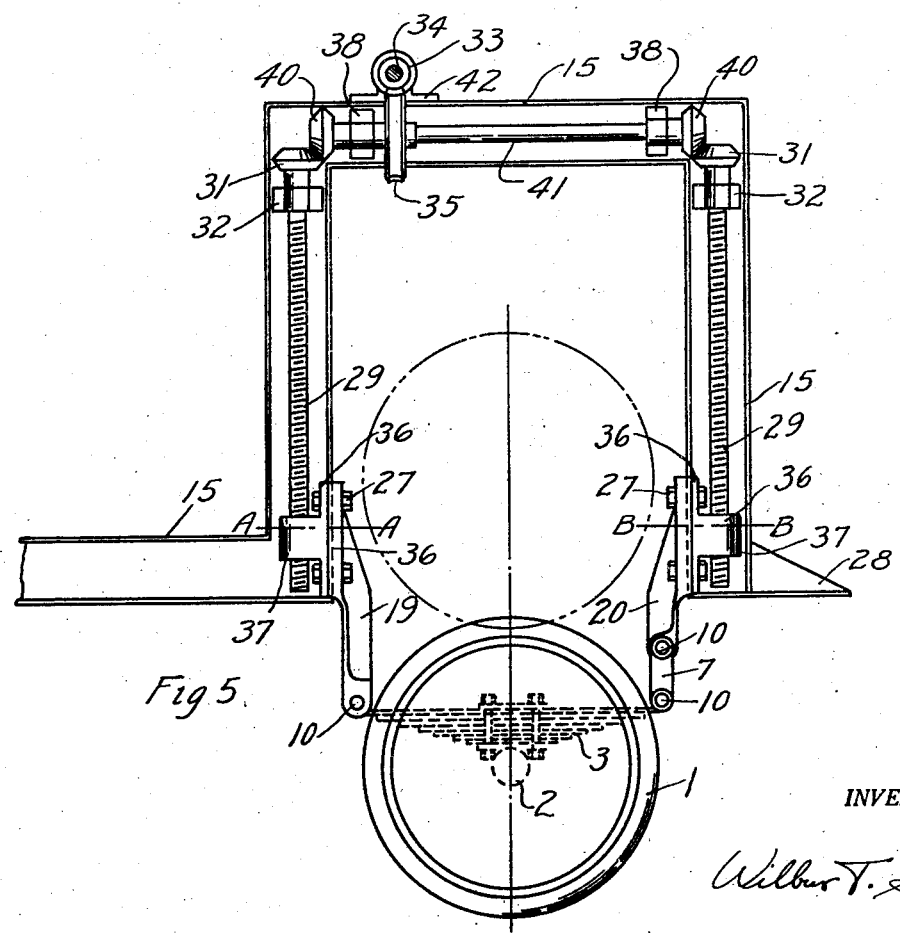

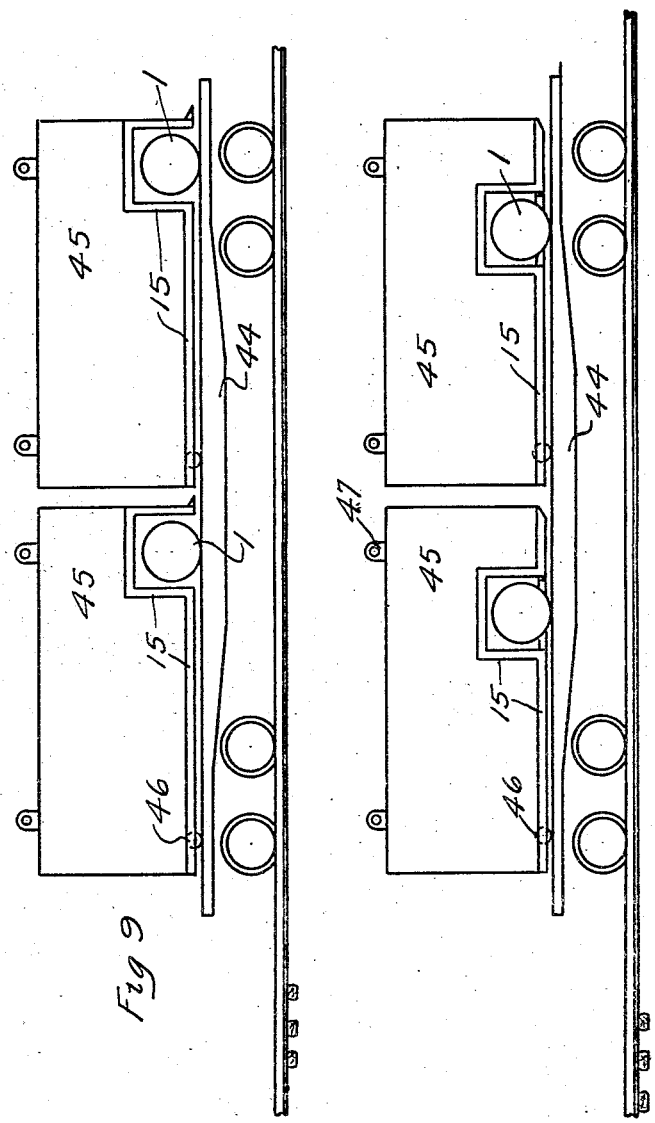

Inventor
Wilbur T. Soulis

Patented Aug. 11, 1936

2,050,471

UNITED STATES PATENT OFFICE 2,050,471

SEMITRAILER

Wilbur T. Soulis, Easton, Pa., assignor to Harold A. Soulis, Easton, Pa.

Application May 17, 1932, Serial No. 611,841

12 Claims. (Cl. 280—80)

The purpose of this invention is to provide means for mounting the semitrailer wheels on a semitrailer frame whereby these wheels may be raised to a position with respect to the semitrailer frame so as to allow the semitrailer frame and the railroad car or truck floor to be close to each other, when the trailer is loaded on the railroad car or truck substantially such as illustrated and described in my patent application "Semitrailers" filed Jan. 26, 1932 Serial Number 588,887. In the transportation of semitrailers on railroad cars, it is important to allow the semitrailer body floor to be close to the railroad car floor. This construction permits a maximum of loading space in the semitrailer. The permissible overall height of a semitrailer when loaded on a railroad car is limited. Therefore, the semitrailer wheels must be raised to a position that will allow the semitrailer frame to rest as close as possible to the railroad car floor.

It is the object of this invention to provide a semitrailer or highway vehicle that can be economically transported on a railroad car. Valuable loading space would be taken by the highway vehicle wheels or bogie, if not removed from the normal position of highway operation. I accomplish this without resorting to costly new railroad equipment, or effecting radical changes therein, automatically or by the operation of mechanical means, to position the vehicle bogie above the frame, when loading on a railroad car. The advantages of this method lie in having the body of the highway vehicle of standard height, to come within the height limits of practical railroad operation when loaded on a railroad car. The semitrailer having its own rolling means, can be discharged from the railroad car at any point in its system, and without expensive special handling equipment, deliver its freight over the highway, to the consignee. It is obvious that this method reduces the transportation costs and shortens the time required from shipper to consignee.

The semitrailer and railroad car are placed in an end to end position with the semitrailer frame overlapping the railroad car floor. The semitrailer axle, wheel and spring assembly, called a bogie, is unlatched. The semitrailer frame is raised so that the underside of the semitrailer frame is above that of the railroad car floor. Therefore, as the semitrailer is backed onto the railroad car, the semi-trailer bogie is raised to an elevation that will allow the semitrailer frame to rest on the railroad car floor. The semitrailer bogie can be raised manually or by power with the proper linkage. The bogie may be raised automatically by the relative movement between the trailer and railroad car, when loading the trailer on the car, or the relative movement between the trailer and railroad car may automatically cause the power to apply to raise or lower the bogie.

To remove the trailer, a reverse operation takes place. The semitrailer is moved off the railroad car floor far enough to allow the semitrailer bogie to be free to move down. When the bogie is in the position required for highway operation, it is latched in place. The trailer can now be coupled to the tractor and pulled away.

The loading or unloading of the semitrailer from the railroad car requires no special equipment. It is also evident that a standard railroad car may be used without alteration in its construction.

The semitrailer can be loaded on any flat railroad car and unloaded at any convenient point on the railroad system. The semitrailer is self contained and can be coupled to any commercial tractor which has been fitted with a fifth wheel, and moved to the location required to discharge its freight. It is obvious that the vehicle may be a full trailer in place of the semitrailer mentioned. In a full trailer two bogies are used in place of one in a semitrailer.

I have been able to keep the semitrailer a self contained unit, without sacrificing the loading height of the semitrailer body. The use of this semitrailer would allow the railroad to shorten the time required for freight shipments between shipper and consignee. It will also eliminate the handling of freight on and off the railroad car. Unit shipments can be made from shipper to consignee under seal.

Other objects and advantages from the utilization of my invention will doubtless present themselves as the description proceeds and I would have it clearly understood that I reserve unto myself all rights to the full range of equivalents, both in manner of practicing my invention and its use, to which I may be entitled under my invention in its broadest aspect. For the purpose of the present disclosure, I have elected to describe a certain preferred design and its modification. However, as previously pointed out, this is not to be interpreted as a limitation of the scope of my invention, which may be followed with equal success in the manufacture of trailers of other designs.

In the drawings:

Figure 1 is a side elevation of the trailer bogie shown mounted on the trailer frame. The wheels are shown down for highway operation in this view. The construction allows the bogie to swing into position. The dotted circle represents the position of the trailer wheels when raised to the position when loaded on the car.

Figure 2 is a rear view of the bogie attached to the trailer frame by pivoting means.

Figure 3 is a side elevation showing the trailer bogie attached to the frame with slide plates. The wheels are raised vertically by the relative movement between the trailer and the railroad car.

Figure 4 is a rear view, in partial section, of the bogie attached by sliding means to the trailer frame.

Figure 5 is a side elevation showing the trailer bogie attached to the frame with slide plates. The bogie is raised by means of screw linkage, to the position shown dotted.

Figure 6 is a sectional view through A—A shown on Figure 5.

Figure 7 is a sectional view through B—B shown on Figure 5.

Figure 8 is a side elevation of a railroad car loaded with trailers having the pivoted type of bogie.

Figure 9 is a side elevation of a railroad car loaded with trailers having the sliding type of bogie.

Figure 10 is a side elevation of a semitrailer conforming to my invention, having its forward end supported from a towing tractor, and Figure 11 is a plan view of the structure shown in the preceding figure.

Figure 14:
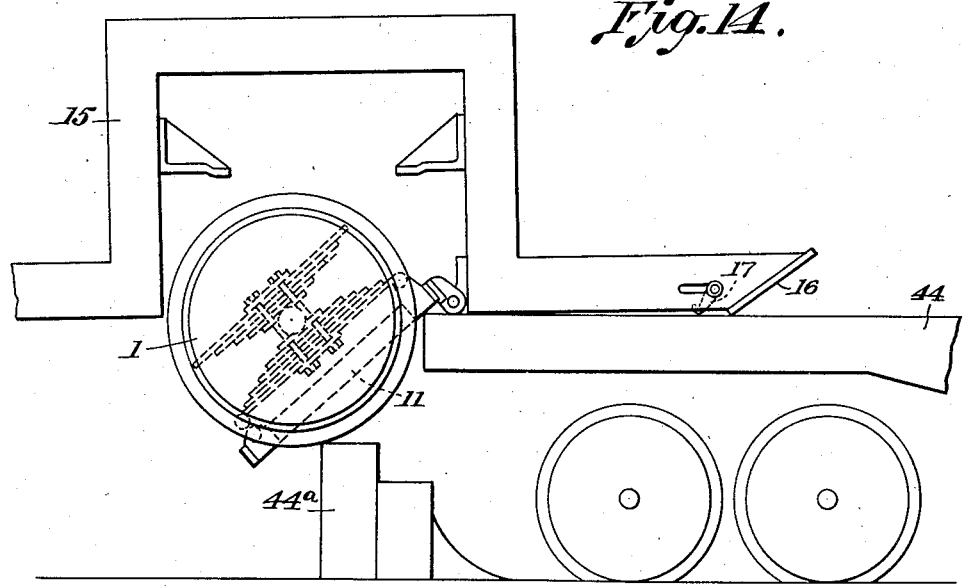
Figure 15:
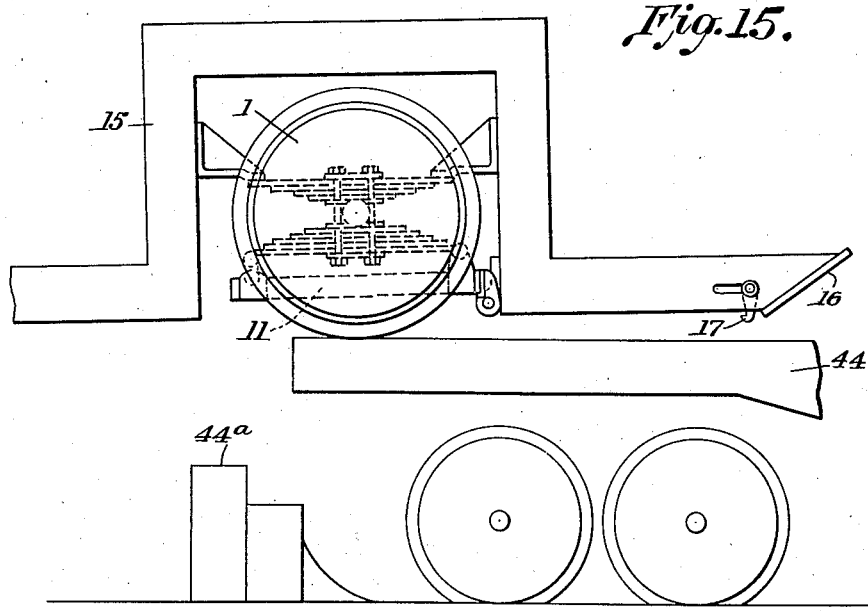

Figures 12 to 15, inclusive, are illustrative of the loading of the vehicle upon a railroad flat car, whereby the vehicle functions as a container.

In Figures 1 and 2, 1 denotes the trailer wheels, 2 the trailer axle, 3 the trailer springs for use, when in the position shown, for highway operation. 5 denotes the bolts used to attach the springs 3 and 6 to the axle 2. 11 denotes the frame upon which the springs 3 and 6 are attached by pins 10 to brackets 8 and 9. Shackle 7 forms a flexible connection between spring 3 and bracket 8. The combination of these parts forms a bogie.

The bogie is pivoted at one end by bracket 13 and pin 12. Plate 16 on trailer frame 15 will ride up an end of the railroad car and lift the wheels 1 off the ground. Latch 17 is now turned to release the bogie frame 11 so as to allow the bogie to swing down and continued motion between the railroad car and the trailer will force the bogie up into dotted position 18. Spring 6 will now contact brackets 14. Brackets 14 are attached to trailer frame 15 so as to carry the weight of the trailer when loaded on a railroad car.

In Figures 3 and 4, 1 denotes the trailer wheels, 2 the trailer axle, 3 the trailer spring for use when in the position shown, for highway operation. 5 denotes the bolts used to attach the spring 3 to the axle 2. These units, in this case, form the bogie. Pins 10 and shackle 7 attach the spring 3 to the slide brackets 19 and 20. Brackets 19 and 20 are held to the I beam section of the trailer frame 15 by plates 49. 27 are bolts to hold brackets 19 and 20 clamped to plates 49. Brackets 19 and 20 are prevented from upward motion by latches 23, fulcrumed on pins 24 and held in place by spring 21. Handle 25 is used to unlock the latches 23 so that brackets 19 and 20 can move upward. The trailer is backed so that bracket 28 is over the end of the railroad car and with latch 23 unlocked continued motion of the trailer will force wheels 1 upward. Upward motion is imparted to the bogie through contact of wheels 1 and an incline built into the terminal ramp. The bogie will move so as to stop when wheels 1 are in the position shown at 26.

In Figures 5, 6, and 7, 1 denotes the trailer wheels, 2 the trailer axle, 3 the trailer spring, 5 the bolts that attach the spring 3 to the axle 2. These units, in this case, form the bogie. Trailer spring 3 is attached to brackets 19 and 20 by pins 10 and shackle 7. Brackets 19 and 20 are attached to the I beam section of frame 15 by plates 36. Plates 36 have bosses 37 threaded to fit screw 29. Screws 29 are held in place by brackets 32. Fixed to the upper end of screw 29 is gear 31 which meshes with gear 40 fixed to shaft 41. Shaft 41 is held in place by brackets 38 which are attached to frame 15. Shaft 41 has worm wheel 35 fixed thereon. Worm wheel 35 meshes with worm 33 fixed to shaft 34. Shaft 34 is held to frame 15 by bracket 42. The bogie may now be raised manually or by power actuated means to turn shaft 34.

In Figures 8 and 9, 45 represents a trailer loaded on a railroad car 44. Wheels 1 are shown raised into recessed frame 15 to allow the trailer floor to rest on or near the railroad car floor. 46 denotes wheels used to assist the rolling of the trailer onto the railroad car. Wheels 46 may have their bearings mounted in rubber or by some other resilient attachment to the frame.

Eyes 47 are used when the trailer is craned over at a terminal equipped with means to lift the trailer off or on the railroad car.

In Figures 10 and 11, a tractor $a$ of a conventional design is shown, to which the semitrailer $b$ embodying my invention, is coupled, at its forward end, for towing, through the medium of a fifth-wheel $c$, in conformity with standard practice.

I claim as my invention:

1. A vehicle having a body, a frame supporting said body, said frame having an offset section recessed into said body, means for supporting said frame when said vehicle is operating upon a highway, said means including wheels, mountings for said wheels, spring suspension devices connected to said mountings, means connected to said frame and to said suspension devices for movement relatively to said frame, locking means cooperating with said latter means to render them immovable relatively to said frame whereby said wheels and said suspension devices will be disposed to function normally relatively to said frame in the operation of the vehicle upon a highway and means actuatable at will to render said locking means ineffective to permit of the bodily movement of said wheels, their mountings and the spring suspension devices connected thereto from their aforesaid normal position relative to said frame to a reversed position within the area defined by said offset frame section.

2. A highway vehicle having a body, a frame, said frame having a section offset above the base line of said body, means for supporting said frame when said vehicle is operating upon a highway, said means including wheels, mountings therefor and spring suspension devices connected to said mountings, rigid elements connected to said suspension devices and adapted to underlie said frame in the functioning of said suspension devices and said wheels in the normal highway operation of said vehicle, hinged connections between said rigid elements and said frame adjacent the aforesaid offset section thereof, said rigid elements being rotatable in said connections to locate said wheels and said suspension devices within the area defined by said offset frame section and means separate from said suspension devices to resiliently support said frame from said wheels when the latter are located within said offset frame section.

3. A highway vehicle having a body, a frame, said frame having a section offset above the base line of said body, means for supporting said frame when said vehicle is operating upon a highway, said means including wheels, mountings therefor and spring suspension devices connected to said mountings, rigid elements connected to said suspension devices and adapted to underlie said frame in the functioning of said suspension devices and said wheels in the normal highway operation of said vehicle, hinged connections between said rigid elements and said frame adjacent aforesaid offset section thereof, said rigid elements being rotatable in said connections to locate said wheels and said suspension devices within the area defined by said offset frame section, said frame and said wheel mountings being capable of relative resilient movement when said wheels are disposed within the area of said offset frame section.

4. A vehicle having a body, a frame supporting said body, means for supporting said frame when said vehicle is operating upon a highway, said means including wheels, mountings for said wheels, means connected to said frame for relative movement and spring suspension devices connected thereto and to said mountings, means cooperating with said supporting means to maintain them immovable relatively to said frame whereby said wheels and said suspension devices will function normally relatively to said frame in the operation of the vehicle upon a highway and mechanism actuatable at will to render said cooperating means ineffective to permit of the bodily movement of said wheels and their mountings, from their normal position relative to said frame to a position above and in advance of that used in highway operation.

5. A vehicle having a body, a frame supporting said body, means at one end of said frame for coupling said vehicle to a tractor for relative pivotal movement, means for supporting the other end of said frame when said vehicle is operating upon a highway, said latter means including wheels and mountings therefor connected to said frame, means connected to said frame and to said mountings for movement relatively to said frame, devices cooperating with said last mentioned means to render them immovable relatively to said frame and said mountings, whereby said wheels will function normally relatively to said frame, in the operation of the vehicle upon a highway, and means actuatable at will to render said devices ineffective to permit of the bodily movement of said wheels and their mountings, from their normal position relative to said frame, to a supporting position above that used in highway operation.

6. A vehicle having a body, a frame carrying said body, means for supporting said frame when said vehicle is operating upon a highway, said means including wheels, mountings therefor embodying resilient suspension elements, means connected to said mountings for movement relatively to said frame said latter means normally functioning to position said wheels and their mountings relatively to said frame for highway operation of the vehicle and means actuatable at will to render said last referred to means displaceable from their normally functioning position to permit of the bodily movement of said wheels and their mountings from such position, to another supporting position above that used in highway operation.

7. A vehicle having a body, a frame carrying said body, means for supporting said frame when said vehicle is operating upon a highway, said means including wheels, mountings therefor and resilient suspension devices connected to said mountings, means interposed between said frame and said devices for movement relatively to said frame, means cooperating with said latter means to render them immovable relatively to said frame whereby said wheels, mountings and suspension devices will function normally relatively to said frame, in the operation of the vehicle upon a highway, and means effective upon said cooperating means under predetermined conditions to permit of the bodily movement of said wheels and their mountings, from their normal position relatively to said frame, to a position above that used in highway operation.

8. A vehicle having a frame, a load-receiving body carried thereby, means for supporting said frame and body in the normal operation of said vehicle, said means including wheels, yieldable suspension devices connecting said wheels to said frame, and mechanism including rotatable connections for moving said wheels and said devices through an arcuate path to dispose said wheels beneath said frame in their aforesaid functioning position, said wheels being and said devices being actuatable in the reverse direction for locating them in another revoluble body-supporting position and above their normal body-supporting position.

9. A vehicle having a frame, a load-receiving body carried thereby, means for supporting said frame and body in the operation of said vehicle, said means including wheels and yieldable suspension devices between said wheels and said frame, and mechanism whereby said wheels may be reversely raised within said body, said mechanism embodying rotatable connections between said suspension devices and the vehicle frame to permit said wheels to move through an arcuate path on an axis transverse of the vehicle to their aforesaid position within the body, in response to effort applied to the latter.

10. A vehicle having a frame, a load-receiving body carried thereby, means for supporting said frame and body in the normal operation of said vehicle, said means including an undercarriage having wheels yieldably suspended therefrom, means connecting said undercarriage to said frame for movement on a transverse axis from its normal supporting position to another position and mechanism actuatable at will to condition said undercarriage for movement relatively to said frame solely in response to the movement of said frame in the direction of its longitudinal axis, when said wheels are held non-rotatable, to locate said wheels in the latter position and means for yieldingly supporting said body from said wheels when they are in such latter position.

11. A vehicle having a frame, a load-receiving body carried thereby, means for supporting said frame and body in the normal operation of the vehicle, said means including an undercarriage having wheels yieldably suspended therefrom, means connecting said undercarriage to said frame for movement on a transverse axis from a position to the rear of such axis to one in advance thereof and means for conditioning said undercarriage for movement relative to the frame solely in response to the longitudinal movement of the frame, the disposition of the undercarriage in one of its two positions locating the axis of rotation of the wheels above the vehicle frame.

12. A vehicle having a frame, means for supporting the frame in the normal operation of the vehicle, said means including an undercarriage having wheels yieldably suspended therefrom, means connecting said undercarriage to said frame for movement from its normal supporting position to a position in reverse thereto, solely in response to the movement of said frame in the direction of its longitudinal axis to locate the axis of rotation of said wheels above said frame and means for yieldably supporting said frame from said wheels when said wheels are in their latter position.

WILBUR T. SOULIS.